Dec. 13, 1955 E. WILDHABER 2,726,877
STEERING MECHANISM WITH DOUBLE REDUCTION GEARS
Filed May 16, 1950 5 Sheets-Sheet 1
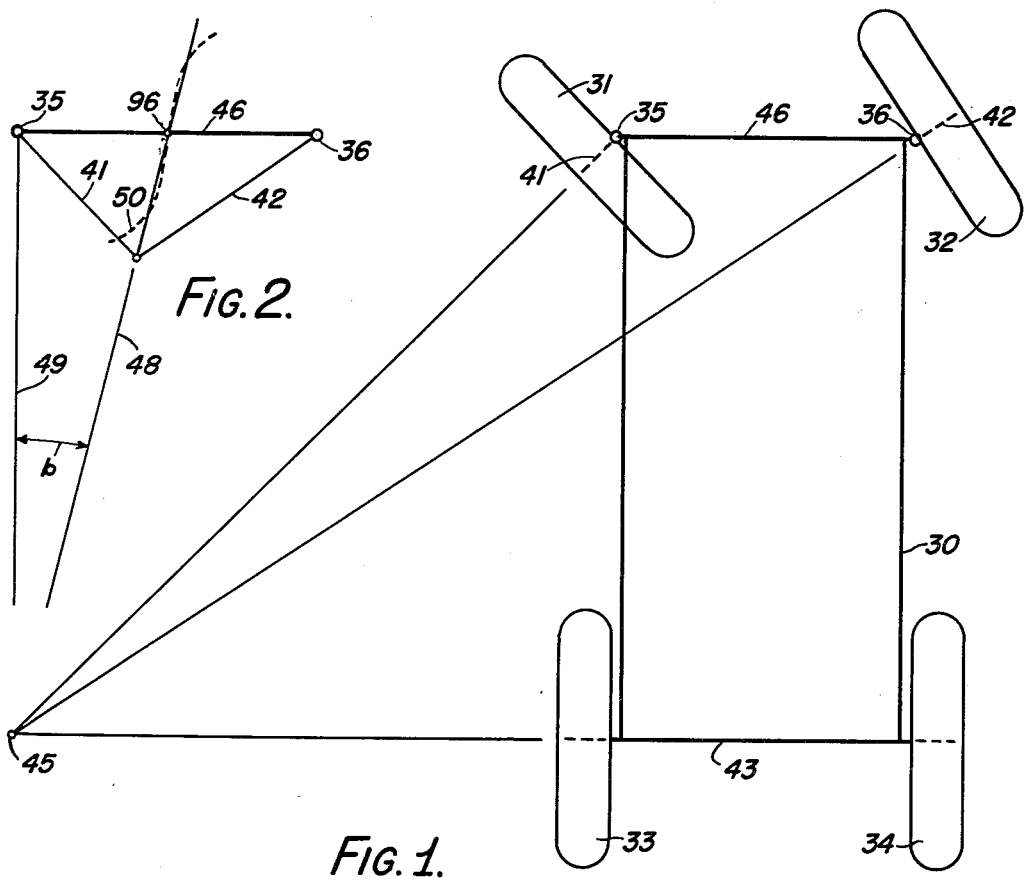
FIG. 2.
FIG. 1.
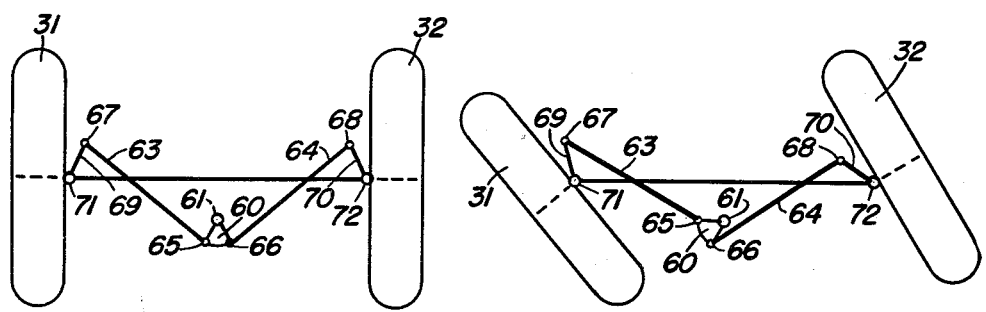
FIG. 3. FIG. 4.
INVENTOR.
ERNEST WILDHABER
BY
ATTORNEY Dec. 13, 1955 E. WILDHABER 2,726,877
STEERING MECHANISM WITH DOUBLE REDUCTION GEARS
Filed May 16, 1950 5 Sheets-Sheet 2

INVENTOR.
ERNEST WILDHABER
BY
ATTORNEY

Dec. 13, 1955     E. WILDHABER     2,726,877
STEERING MECHANISM WITH DOUBLE REDUCTION GEARS
Filed May 16, 1950     5 Sheets-Sheet 3
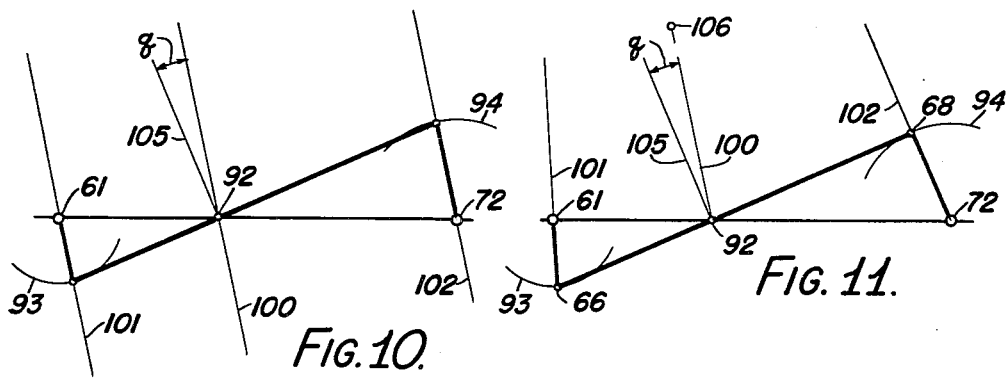
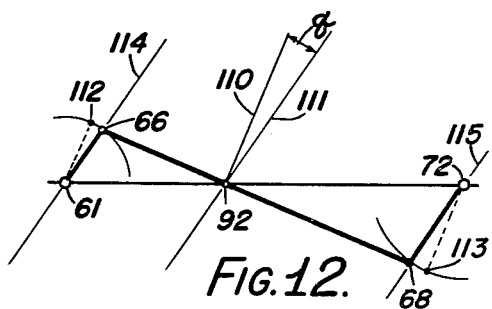
INVENTOR.
ERNEST WILDHABER
BY
ATTORNEY Dec. 13, 1955 E. WILDHABER 2,726,877
STEERING MECHANISM WITH DOUBLE REDUCTION GEARS
Filed May 16, 1950 5 Sheets-Sheet 4

INVENTOR.
ERNEST WILDHABER
BY
ATTORNEY

Dec. 13, 1955     E. WILDHABER     2,726,877
STEERING MECHANISM WITH DOUBLE REDUCTION GEARS
Filed May 16, 1950     5 Sheets-Sheet 5

INVENTOR.
ERNEST WILDHABER
BY
ATTORNEY

United States Patent Office 2,726,877
Patented Dec. 13, 1955

2,726,877

STEERING MECHANISM WITH DOUBLE REDUCTION GEARS

Ernest Wildhaber, Brighton, N. Y.

Application May 16, 1950, Serial No. 162,196

5 Claims. (Cl. 280—96)

The present invention relates to steering mechanism for automotive vehicles, such as automobiles, buses, trucks, and the like.

In conventional steering mechanisms when the steered wheels are turned to round a corner, the wheels do not have true rolling motion. There is some lateral slippage. This lateral slippage causes wear of the tires and requires greater effort in steering. Furthermore, this lateral slippage increases the danger of sliding on icy roads; and because of it, the front steering wheels of the vehicle must be toed-in.

The conventional steering linkage is a trapezoidal linkage in the case of a one-piece axle. Independently sprung wheels are generally steered from a pivoted member, a bell crank lever, which is operated through gears from the steering wheel and which effects the swivelling of the two wheels through linkages. In conventional designs, this linkage arrangement is made to simulate the trapezoidal linkage.

One object of the present invention is to provide a steering mechanism, and particularly a steering linkage, with which a much closer degree of approximation of pure rolling motion can be attained than can be achieved with any known steering mechanism.

Another object of the invention is to provide a steering mechanism of relatively simple construction which will attain this object without addition of parts as compared with conventional steering mechanisms.

Another object of the invention is to provide a steering mechanism so constructed that the rolling motion will be so true that the toe-in now provided in mounting the front wheels of a vehicle can be very considerably reduced or even eliminated, and with which the danger of slippage on icy roads is reduced.

A further object of the invention is to provide a steering mechanism so connected to the wheels that a rolling motion of such perfection is attained that wear of the front tires is reduced.

Another object of the invention is to provide a steering mechanism which can be used either with independently sprung wheels or with wheels mounted on a single-piece front axle.

Another object of the invention is to provide a steering linkage with good control in all positions, and one which can be operated throughout its range without excessive loads.

A further object of the invention is to provide an improved design of steering linkage which has advantages not achieved with the conventional trapezoidal linkage.

Another object of the invention is to devise a steering linkage of either symmetrical or unsymmetrical design, which is operated from a pivoted member whose pivot axis is preferably vertical and which is operable from the steering wheel through gears.

A further object of the invention is to attain higher efficiency in the steering drive. To this end, a further object of the present invention is to devise an accurate linkage in which the central pivoted member turns through larger angles to attain given swivel angles of the wheel axis.

A still further object of the invention is to provide a steering linkage in which the leverage is larger at the extreme steering angles than at the middle position.

Still another object of the invention is to provide a steering mechanism in which a central pivoted control member for actuating the steering linkage is driven through two pairs of gears, of which each pair has angularly disposed axes, and of which both pairs are mounted in the same housing.

A still further object of the invention is to provide a steering linkage which is operable through two pairs of gears with angularly disposed axes, one pair being preferably a pair of bevel gears, of which one is secured to the shaft of the steering wheel, and the other pair being preferably a hypoid gear pair, the gear member of the hypoid pair forming part of the pivoted member by which the steering linkage is actuated.

Other objects of the invention will be apparent hereinafter from the specification and from the recital of the appended claims.

In the drawings:

Fig. 1 is a diagram explanatory of the principles underlying the present invention;

Fig. 2 is a further diagram explanatory of the required relationship between the swivel angles of the two wheel heads or steering knuckles of an automotive vehicle;

Fig. 3 is a diagrammatic view of a linkage constructed according to one embodiment of the present invention for turning the wheel heads or steering knuckles in the proper relationship, and showing this linkage in a central position;

Fig. 4 is a diagrammatic view of this linkage showing it in one end position;

Figs. 10 and 11 are diagrams illustrating individual link connections constructed according to still further modifications of the invention;

Fig. 12 is a diagram illustrative of a further application of the principles of my invention;

Figure 5:
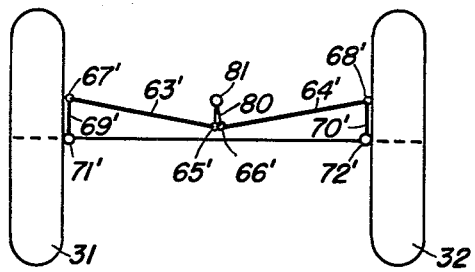
Fig. 5 is a diagrammatic view of a similar linkage in a different arrangement, the linkage being shown in the central position.

Reference will now be had to the drawings for a more detailed description of the invention. In Fig. 1, 30 denotes the chassis or frame of an automotive vehicle. 31 and 32 are the front wheels of this vehicle and 33 and 34 the rear wheels. When the front wheels 31 and 32 are turned to the left, as shown in Fig. 1, they should be swivelled at different rates on their pivots 35 and 36. The inner wheel 31 should be swivelled more. True rolling occurs if all the wheel axes 41, 42 and 43 intersect at the turning point 45 of the vehicle.

In Fig. 2 the axis 42 of the wheel 32 is drawn as in Fig. 1. The axis 41 is drawn inclined to the line 46 at the same angle as in Fig. 1 but on the opposite side. It has been demonstrated that the axes so plotted intersect in a straight line 48 when they fulfill the rolling requirement shown in Fig. 1. Line 48 is inclined to the longitudinal direction 49 of the vehicle at an angle $b$ which depends on the proportion of the distance L between the pivots 35 and 36, to the wheel base W of the vehicle. The angle $b$ fulfills the equation:

$$\tan b = \frac{L}{2W} \quad (1)$$

as known.

Conventional linkages do not give the exact relationship between the swivel positions of the two wheels as required for true rolling contact. If the positions of the two wheels, as obtained, are plotted as in Fig. 2, the lines representing the wheel axes will not intersect exactly at points of the line 48. Their intersection points will lie on a curve 50 indicated in dotted lines in Fig. 2. This curve is characteristic of the linkage used and shows its errors or shortcomings. My linkage, as indicated in Figs. 3 to 5 inclusive produces so nearly true rolling motion that its characteristic curve appears to coincide with the line 48 at the scale used in Fig. 2.

Like a conventional linkage, the linkage illustrated in Figs. 3 and 4 is operated from a central pivoted member 60 which is mounted on the vertical axis 61 of the vehicle. To this member 60 are attached two links or tie rods 63 and 64 ordinarily by ball joints 65 and 66. These tie rods are connected at their opposite ends by means of ball joints 67 and 68 to the knuckle arms 69 and 70 which swivel about the axes of the steering knuckles 71 and 72 together with the wheels 31 and 32.

In accordance with the present invention, the knuckle arms 69 and 70 extend in a forward direction from the steering knuckles 71 and 72, and in their middle positions, shown in Fig. 3, the knuckle arms form an acute angle with their links or tie rods 63 and 64. Likewise, the radii 61—65 and 61—66 form acute angles with their respective links 63 and 64 in the central position. The links 63 and 64 cross the imaginary center lines 61—71 and 61—72. Hence, the steering knuckles are turned in a direction of rotation opposite to the direction of rotation of the central member 60.

It should also be noted that the ratio between the turning velocities about axis 61 and about the steering knuckles is larger than in conventional designs. In the central position, the instantaneous ratio is larger than 1¼:1. It is 1½:1 in the example shown. The central member 60 turns through larger angles than are used in conventional steering mechanism. This is helpful in reaching top efficiency and also for compactness of the drive. Fig. 4 shows that sound leverage and good control is attained even in an extreme position.

Fig. 5 illustrates diagrammatically an arrangement of my linkage where the axis 81 of the central pivoted member 80 is disposed forward of the wheel centers. The same individual link connections are used, however, as in the embodiment illustrated in Figs. 3 and 4, and are designated by the same numerals as in Figs. 3 and 4 primed. Here the two radii 81—65' and 81—66' include only a small angle with each other as compared with the construction illustrated in Figs. 3 and 4.

The meaning of steering errors will now be explained and defined with reference to Fig. 6. As already stated for pure rolling motion the axes of the two front wheels should in all turning positions intersect in a line 48 when plotted as in Fig. 2. When the corresponding steering angles of the two wheels are plotted from the pivots or steering knuckles 35, 36 in Fig. 2, however, the legs of the angles 35—36—83 (Fig. 6) and 36—35—83 may intersect at a point 83 which lies outside of the line 48 where it should lie. This means that pure rolling about the turning center cannot take place. The closer the point 83 lies to the line 48, though, the more nearly pure rolling occurs.

To measure the departure from pure rolling it is assumed here that the rear wheels have pure rolling contact, and that the turning motion occurs about a center so placed that the two front wheels are equally inclined to the direction of rolling about said center. Pure rolling would occur if the intersection of the two legs of the steering angles were at the point 83' on the line 48. Point 83' is so determined that the angles 83'—35—83 and 83'—36—83 are alike. As known in mathematics this requires that the point 83' lie on a circle 85 which passes through the points 35, 36 and 83. It is a known property of the circle that the angles drawn over the same arc of the circle to any point of the circle are alike.

These equal angles $\Delta\theta$ define the departure from true rolling contact. If a toe-in is used in the central position, angle $\Delta\theta$ defines the change of the toe-in. On the other hand, if the wheels run parallel in the central position, angle $\Delta\theta$ gives the positive or negative toe-in obtained in the plotted position. Angle $\Delta\theta$ can be computed as well as constructed.

Figures 7, 8:
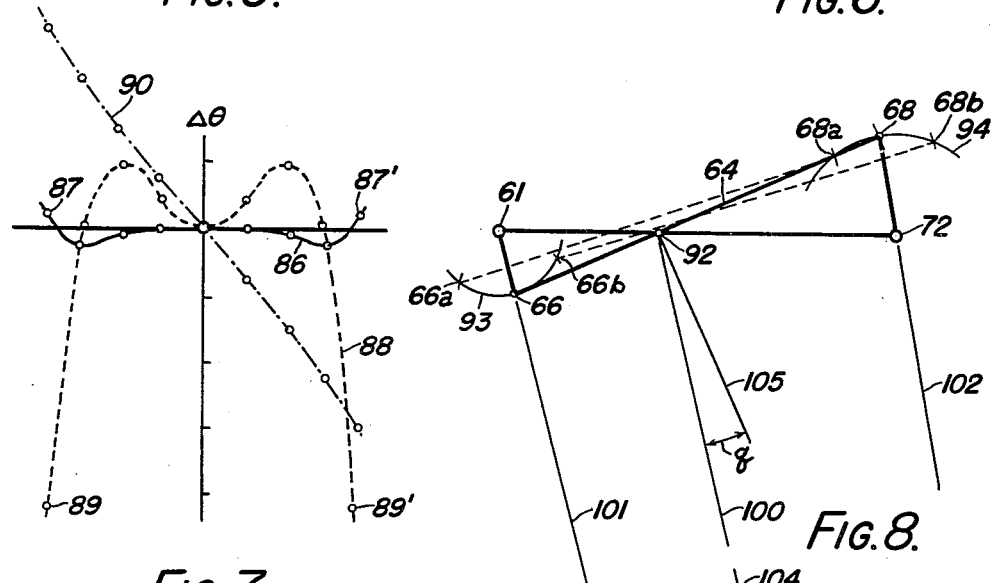
Fig. 7 is a graph showing in magnification how the linkage illustrated in Figs. 3 to 5 inclusive compares with the conventional steering linkage.
Fig. 8 is a diagram indicating an individual link connection constructed according to this invention.

The graph of Fig. 7 shows the angle $\Delta\theta$, the inclination to the rolling direction for a linkage constructed according to my invention. This angle is plotted in vertical direction. The abscissa, or horizontal direction gives the average swivel angle of the steering knuckles. For any one steering position, the swivel angle of one wheel axis is added to the swivel angle of the other wheel axis, and the sum is divided by two, to obtain the average swivel angle of the wheel axes. The small circles denote computed points. The curve 86 drawn in full lines corresponds to an example of a steering linkage constructed according to my invention. The extreme points 87 and 87' represent an average swivel angle of 35° 22½' and an angle $\Delta\theta$ of steering error of 2'. As this average swivel angle corresponds to individual swivel angles of 30° 41' and 40° 4' of two wheel axes, the plotted range covers the total range needed in practice. The graduations of the vertical scale denote intervals of 10'. It is seen that the linkage characterized by the curve 86 contains a maximum steering error angle $\Delta\theta$ of less than 3'.

For comparison with a known linkage, a curve 88 is also plotted. This curve describes a trapezoidal linkage recommended in the book "The Automotive Chassis" by C. M. Heldt for a limiting deflection of 40°. The outermost plotted points of the curve 88 correspond to a steering error angle $\Delta\theta$ of 42' at an average swivel angle of 34° 43'. The improvement in the action obtained with my linkage is readily apparent.

The curve 90 of Fig. 7 gives the turning angles of the central pivoted member 60 (Figs. 3 and 4) in terms of the average swivel angles of the two steered wheels. The feature to be illustrated thereby is the general shape of the curve. The vertical scale shown does not apply to this curve. This curve has a slight S-shape. Its ends are steeper than its middle portion. This means that near the end positions the pivoted member 60 has to turn more to produce a one degree swivel angle change than near the middle position. In other words, the reduction ratio is larger near the end positions where the resistance to the swivel motion of the wheel axes is also the larger. The instantaneous ratio of the turning angles is given by the inclination of the tangent to the curve 90. As known in mathematics, it is proportional to the trigonometric tangent of the inclination angle at the point considered.

The linkages indicated in Figs. 3 to 5 are each composed of two symmetrical simple linkages, which connect the pivoted member 60 to the right hand wheel and to the left hand wheel, respectively. One of the two simple linkages of the complete linkage will now be considered separately.

Fig. 8 shows the right hand linkage of the pair at a larger scale in its mean position. The link or tie rod 64 is represented here by its central line which connects the joints at 66 and 68 which are here denoted by their centers. This line, hereafter called the link line, intersects the center line 61—72 at the point 92 through which passes the instantaneous axis of relative motion in the shown position.

In operation, the point 66 describes a circle 93 about the center 61, and the point 68 describes a circle 94 about the center 72. Positions 66a and 66b of the point 66 are equally spaced from the mean position of said point, that is, they are plotted so that the angles 66—61—66a and 66—61—66b are equal. The corresponding positions 68a and 68b of the point 68 are obtained by measuring off the length 66—68 of the link on the circle 94 from the point 66a and 66b. The swivel angles 68a—72—68 and 68b—72—68 are unequal, the latter being the larger.

When the pivoted member 60 turns on its pivot 61 through an angle 66—61—66b, the wheel to the right is swivelled through an angle 68—72—68b. The wheel to the left is at the same time swivelled to the left by its simple linkage, which is symmetrical to the simple linkage shown. Counter-clockwise rotation of the member 60 causes the left wheel to swivel through an angle equal to the angle 68—72—68a produced by clockwise rotation of the member 60 through the linkage shown. In other words, the swivel angle 68—72—68b and 68—72—68a are corresponding swivel angles of opposite wheels. They should fulfill the relationship illustrated in Figs. 1 and 2.

A most important part of the steering region is the central portion. It is the portion used by far the most. The steering curve describing the linkage in the way indicated in Fig. 2 should have the proper inclination at the mean point 96 (Figs. 2 and 6) of the central portion. The inclination angle $b$ of line 48, to which the steering curve should preferably be tangent at point 96, is defined in Equation 1. This inclination, or any other desired inclination $b$, is attainable in many ways of which the basic requirements follow.

Figure 9:
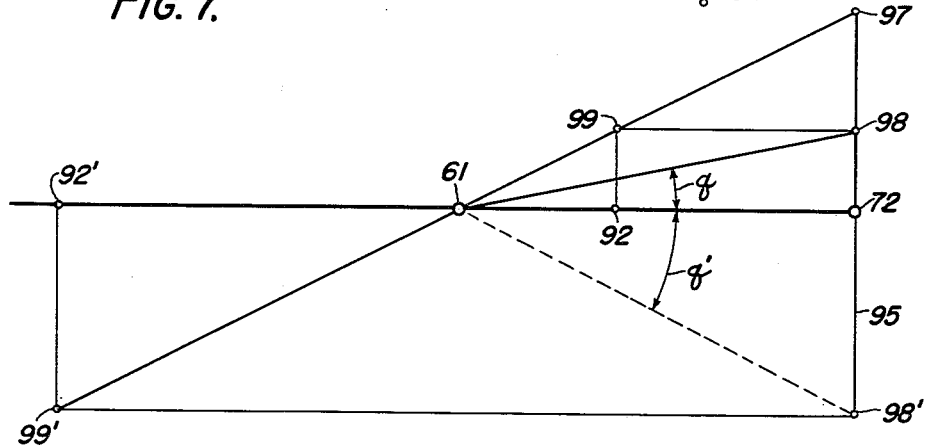
Fig. 9 is an auxiliary diagram further illustrating this connection.

On a line 95 (Fig. 9) extending through the point 72 at right angles to the central line 61—72 plot a distance 72—97 which is equal to [2 tan $b$] (61—72). Reduce this distance in the proportion of distance 61—92 to distance 61—72, to obtain the distance 72—98. This reduction may be obtained by drawing the line 92—99 through instantaneous center 92 perpendicular to the line 61—72, to obtain the intersection point 99 with line 61—97, and then drawing the line 99—98 parallel to the line 61—72, to obtain the point 98 on the line 72—97. The angle 72—61—98 is denoted at $q$ and has a significance which will now be described.

In the simple linkage of Fig. 8 the center distance 61—72 is assumed or chosen. Likewise the instantaneous ratio of the linkage is assumed, that is, the proportion of distance 92—72 to distance 61—92. This ratio is 1½:1 in the example illustrated. Further, the position of the point 68 is assumed, or instead an equivalent assumption is made. The position of point 68 is so assumed that the point lies at a convenient distance from the turning center or knuckle center 72. The central line of the link or tie rod 68—66 can now be drawn in through the points 66 and 92. What remains to be determined is the direction of the arm 61—66.

Figure 6:
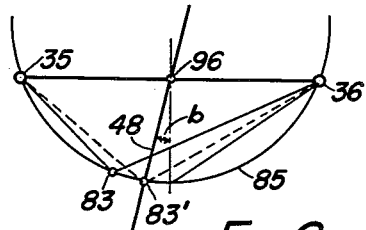
Fig. 6 is a diagram illustrating the effect of linkage errors or shortcomings.

According to my invention this direction is determined so that the characteristic line or curve of the linkage in a diagram like Fig. 2 has a given inclination $b$ at mean point 96 (Fig. 6). At this point it should be tangent to line 48, but any other inclination $b$ can be employed equally well.

It can be demonstrated mathematically that the resulting curve has an inclination $b$ at point 96 when the three lines 100, 101 and 102 (Fig. 8) intersect at a common point 104. Lines 101 and 102 are the extension of lines 61—66 and 68—72, respectively. Line 100 passes through the instantaneous axis 92 and is inclined at the characteristic angle $q$ to the line 105 which is drawn normal to the line 66—68. The determination of angle $q$ has already been described with reference to Fig. 9.

The linkage thus determined gives a steering curve which extends at mean point 96 (Figs 2 and 6) in a direction inclined at the angle $b$ to the line 49 drawn perpendicular to line 61—72. This curve practically coincides with the line 48 for the linkage identified below.

The graph of Fig. 7 also corresponds to this linkage. Its specific data are:

$$\frac{\text{distance } 92\text{—}72}{\text{distance } 61\text{—}92} = 1\tfrac{1}{2}:1$$

$$\text{Arm length } (72\text{—}68) = \tfrac{1}{4}(61\text{—}72)$$

$$\text{Arm angle } (92\text{—}72\text{—}68) = 80°$$

$$\tan b = \tfrac{1}{4}$$

It illustrates by way of an example the high accuracy obtainable by proceeding in accordance with my disclosure.

In the simple linkage illustrated in Fig. 8 the intersection point 104 of the lines 100, 101 and 102 lies below the base 61—72. Fig. 10 illustrates the case where the lines 100, 101 and 102 are parallel and intersect at infinity. The same instantaneous ratio of $$\frac{\text{distance } 92\text{—}72}{\text{distance } 61\text{—}92}$$

and the same arm length 72—68 is here used as in the linkage of Fig. 8. The characteristic angle $q$ is the same; and the same inclination $b$ is attained when the swivel angles or steering angles are plotted as in Fig. 2. As regards the inclination, the linkages of Figs. 8 and 10 are equivalent.

A further equivalent linkage is illustrated in Fig. 11. Its angle 92—72—68 is smaller, but otherwise all the data are the same. Here the lines 100, 101, 102 intersect at a point 106 above the base 61—72.

It is seen that the angle $q$ above defined characterizes the mean inclination of the resultant curve.

All the individual linkages described above relate to the connection between the pivoted member and the steering knuckle of the right hand wheel. A similar linkage of opposite hand is used for the left hand wheel, as readily understood.

A modified linkage for the right hand wheel is illustrated diagrammatically in Fig. 12. Line 110 denotes the normal at point 92 to the tie rod 66—68. Line 111 corresponds to the line 100 in Figs. 8, 10 and 11. It is inclined at the angle $q$ to the normal 110 but in an opposite sense from Figs. 8, 10 and 11. It comes closer to the pivot point 61 than the normal 110. The tie rod 66—68 is here shorter than the distance 112—113 between the projections of the pivots 61 and 72 to the tie rod. In Figs. 8, 10 and 11 the tie rod 66—68 is longer than said distance. The lines 114 and 115 are the extensions of the lever arms 61—66 and 68—72, respectively. Again the lines 111, 114 and 115 intersect at the same point. In the case specifically illustrated in Fig. 12 this point is at infinity and the lines 111, 114 and 115 are parallel.

For accuracy of motion I prefer the linkages indicated in Figs. 8, 10 and 11 to the linkages of the type indicated in Fig. 12. In other words, smaller steering errors result in the first embodiment.

The above described simple linkages have their instantaneous axis 92 located between the turning centers or pivots 61 and 72. The turning motions about the two centers are then in opposite directions of rotation.

It has thus been shown how to determine a linkage so that in the diagram in Fig. 2 the characteristic curve has a given inclination $b$ at the mean point 96. With this procedure a variable is eliminated. Linkages may be compared all of which have one feature in common, namely, the inclination $b$ of the characteristic curve at the mean point. Various linkages of equal inclination may now be examined on the drawing board by plotting a few points of the characteristic curve (Fig. 2). The most promising ones are quickly determined in this way.

Computation is preferably used for the final selection. The above described geometrical procedure can also be expressed by equations. Likewise, the steering errors can be exactly computed once a linkage has been assumed. The linkage giving the least errors is then determined by interpolation.

Figure 13:
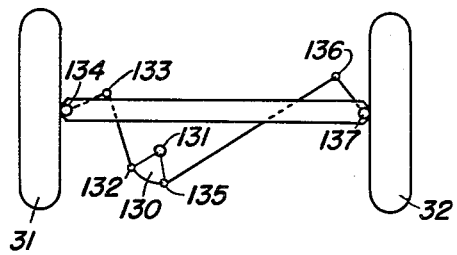
Fig. 13 is a diagrammatic view, similar to Fig. 3, and showing an unsymmetrical steering linkage made according to one embodiment of this invention, the linkage being shown in a central position.

The principles, on which the present invention are based, are also applicable when the simple linkages controlling the two wheels are unsymmetrical. Fig. 13 illustrates such an application. The pivot 131 of the control member 130 is here placed to the left of the longitudinal center line of the vehicle. The two linkages 131—132—133—134 and 131—135—136—137 are different and have different center distances 131—134 and 131—137. Each of these linkages is constructed according to the above described principles, so that they both give the same inclinations $b$ of the characteristic curve (Fig. 2).

Figure 14:
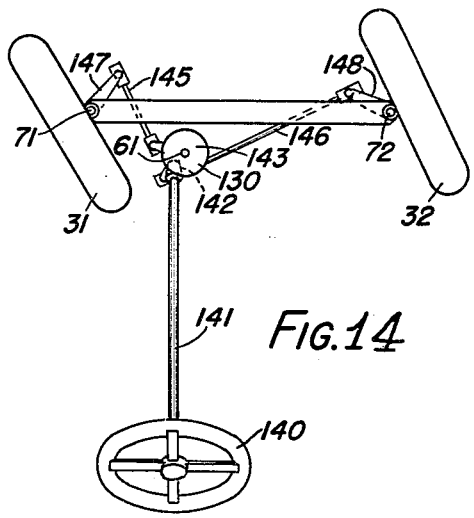
Fig. 14 is a drive diagram of a linkage such as illustrated in Fig. 13, the wheels being turned to the left for a left hand turn of the vehicle.

Fig. 13 indicates the mean position, that is, the steering position for straight line motion of the vehicle. In Fig. 14 a steering position for turning is indicated. This figure is also a drive diagram. The steering wheel 140 is secured to a column or shaft 141 which carries a hypoid pinion 142 at its lower end that meshes with a hypoid gear 143. This gear is mounted so that its teeth face downwardly. This arrangement is necessary to corelate the left hand motion of the steering wheel with the left hand swivelling motion of the wheels 31 and 32 about the steering knuckles; and the right hand motion of the steering wheel 140 with the right hand motion of the wheels 31 and 32 about their knuckles. The pivoted member 130 has the opposite direction of motion. Known structure for avoiding backlash may be used on the tie rods 145 and 146.

Figure 15:
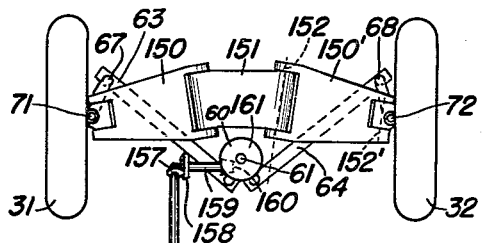
Fig. 15 is a drive diagram showing a linkage such as illustrated in Fig. 3 as applied to independently sprung front wheels.

An application suited especially for independently sprung wheels is shown in Fig. 15. The steering knuckles and wheels have a suspension of the parallel link type of which only the lower lever arms 150, 150' are shown. These are pivotally attached to a part 151 which is rigidly connected to the frame or to the combined frame and body. At their opposite ends each lever arm is pivotally attached to the upright link which contains the steering knuckle. The two pivots of each lever are parallel as indicated at 152, 152' for the arm 150'.

Steering is controlled from a central pivoted member 60 mounted on a vertical axis 61. This member transmits swivelling motion to the steering knuckles 71, 72 through a pair of ball joints 65, 66 (Fig. 3), tie rods 63, 64, and ball joints 67, 68.

When a wheel moves upwardly because of contact with a road obstacle, its tie rod moves with it as though it were swinging about an axis close to pivot 152 and parallel to that pivot. As is known, the ball joint 65 or 66 of this tie rod should lie on said axis so that steering is not affected by springing.

Figure 18:
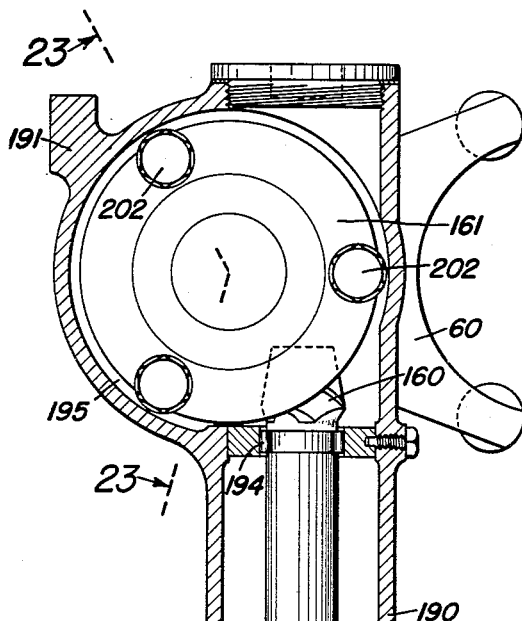
Fig. 18 is an axial section through the gear housing of a drive constructed according to Fig. 15, this section being taken along the line 21—21 of Fig. 19, looking in the direction of the arrows.
Figure 20:
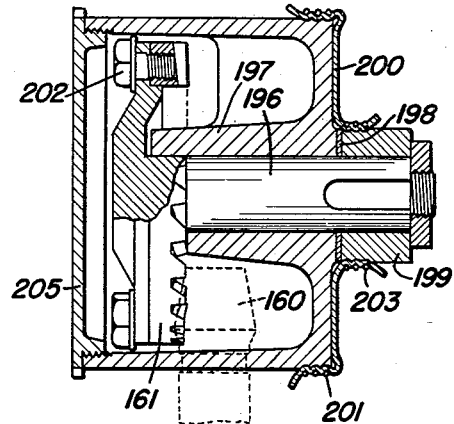
Fig. 20 is a section on the line 23—23 of Fig. 18 looking in the direction of the arrows.
Figure 19:
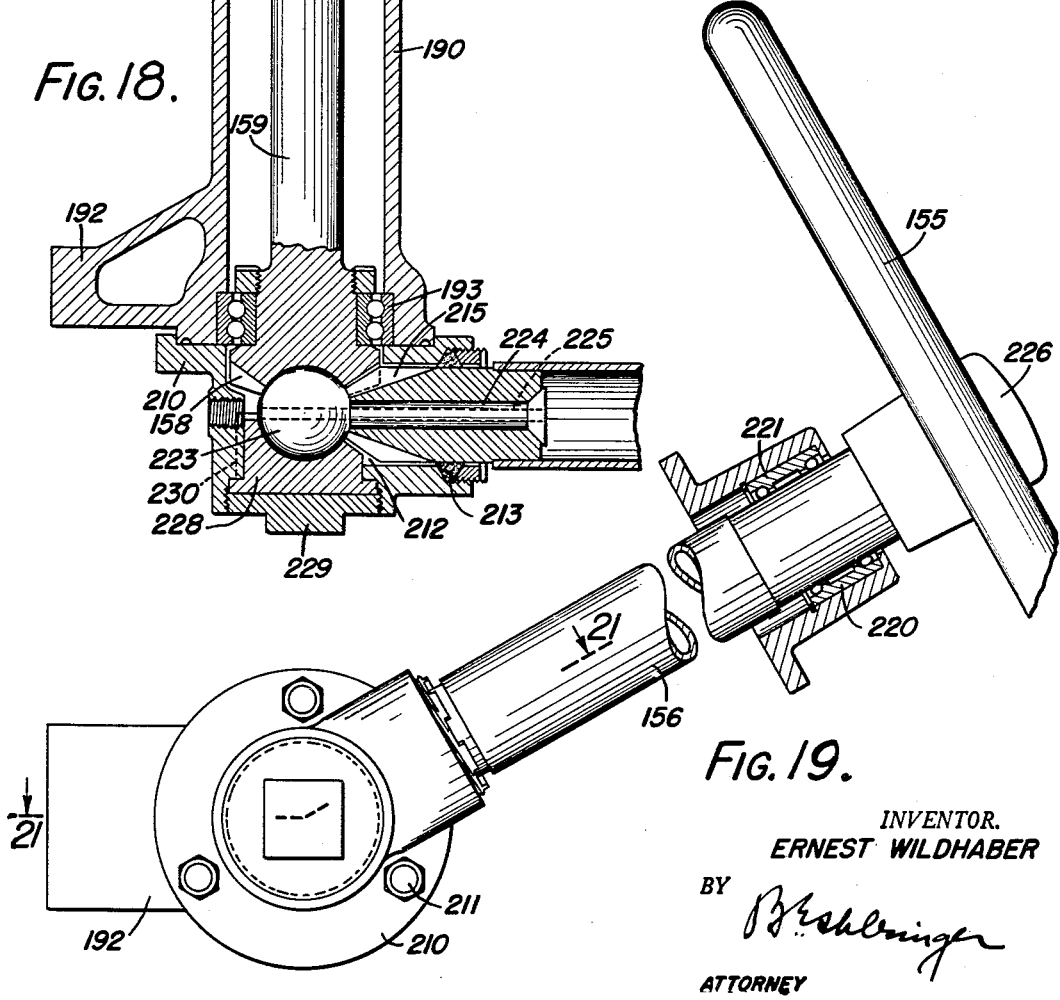
Fig. 19 is a view of this steering mechanism looking at the steering column thereof.

An important part of my invention resides in the drive to the central pivoted member 60 from the steering wheel 155 (see also Figs. 18 to 20). A bevel pinion 157, which is secured to the lower end of the steering shaft 156, meshes with a bevel gear 158. This bevel gear is secured to one end of a transverse shaft 159 which carries at its other end a hypoid pinion 160 that meshes with a hypoid gear 161 which is rigidly secured to the turning member 60 face down. Since the shaft 159 turns through relatively large angles the tooth loads in the bevel gear pair are light; and a given small amount of backlash in the bevel gears has practically no effect on the backlash of the pivoted member. It is reduced in its effect by the ratio in the hypoid drive which may be 7½:1 or larger.

Except for the final reduction at the hypoid pair, the transverse drive is lightly loaded and can be made light in weight. Furthermore it permits of swinging the member 60 through larger angles than would otherwise be practical. This, in turn, reduces the final reduction and permits of a larger effective leverage at large steering angles. Last, but not least, this design permits of splitting up the gear ratio between the bevel gear pair and the hypoid gear pair. For instance, a total ratio of 15:1 may be split up into a ratio of 2:1 in the bevel gears and into a ratio of 7½:1 in the hypoid gear pair. With this ratio a practical hypoid design is feasible with only a moderate amount of tooth sliding. The double reduction thus has a high efficiency and a minimum of wear. The double reduction in itself is desirable for this reason. In my invention it is used, also, for connecting the offset steering shaft with the central pivoted member. It does away with the drag-link heretofore used.

With the linkage shown the central pivoted member 60 turns in the opposite direction from the steering knuckles and the wheels which are secured thereto. The steering wheel should turn in the same direction as the steering knuckles and wheels. This is accomplished in the arrangement of Fig. 15 by placing the bevel pinion on the same side of its apex as the steering wheel 155 and by mounting the hypoid gear face down.

Figure 16:
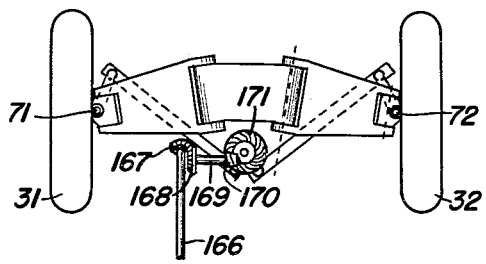
Fig. 16 is a drive diagram showing a slightly modified steering linkage for the same purpose.

In the embodiment shown in Fig. 16 the same object is accomplished by placing the bevel pinion 167 on the side of its apex opposite to the steering wheel. Pinion 167, which is secured to the lower end of the steering column or shaft 166, meshes with a bevel gear 168 which is integral with a transverse shaft 169. This shaft carries at its opposite end a hypoid pinion 170 that meshes with a hypoid gear 171. The latter is secured to the pivoted member 60 of the drive. Its teeth face upwardly. With the two pairs of gears turned around in the way described, the desired turning directions are also accomplished.

Figure 17:
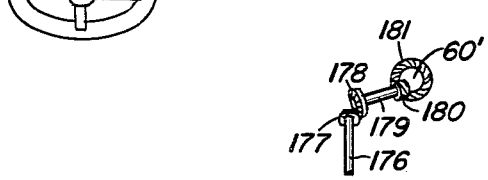
Fig. 17 is a fragmentary view showing a modified form of drive employing two pairs of gears, the axes of the gear pairs being at obtuse angles to each other.

Fig. 17 indicates a drive for another kind of linkage where the pivoted member turns in the same direction as the steering knuckles and their wheels. Both kinds of drives can be made either right angle drives, or angular drives with shaft angles different from right angles. The drive shown in Fig. 17 is an angular drive. The axis of the transverse shaft 179 forms an obtuse angle with the axis of the steering shaft 176, and another obtuse angle with the vertical direction of the axis of the pivoted member 60'. The hypoid gear 181 is here a crown gear meshing with an offset hypoid pinion 180. Pinions 177 and 178 are angular bevel gears preferably having straight teeth. Such gears can be produced very readily.

The embodiment of Fig. 15 is further illustrated in Figs. 18 to 20 inclusive which show the gear arrangement in more detail and on a larger scale. The housing 190 is rigidly secured to the frame or may even be integral with a substitute for the frame. The projections 191 and 192 of the housing may be bolted to the frame. The housing contains a tubular portion in which the transverse shaft 159 is mounted on antifriction bearings 193 and 194. The hypoid pinion 160 on this shaft reaches into the housing portion 195 where the mating hypoid gear 161 is mounted. The latter is shown as a full gear but may be of segmental form. The gear 161 is secured by screws 202 to the enlarged upper end of a shaft 196 which is rotatably mounted in a bearing 197 (Fig. 20) of the housing. The gear 161 rests upon the pinion 160. In the opposite direction axially it is held by a spacer 198 maintained in a fixed axial position by the hub portion 199 of the pivoted member 60. Wear can be taken up by substituting a spacer 198 of larger thickness so that the hypoid gear is set in axially towards the pinion.

Any suitable kind of oil seal may be used. I have shown a neoprene membrane or blanket 200 which is tightly secured to the housing portion 197 by a wire 201 and which is tightly secured to the hub portion 199 by a wire 203. The membrane or blanket permits relative pivotal movement through torsional deflection. Seals of this kind, with tightly connecting ends, can be kept free of any leakage.

The hypoid gear 161 is mounted wholly in the housing 190; and the cover 205 (Fig. 20), which is threaded into the housing, serves merely to close the top of the housing.

A head 210 is secured to the end of the housing 190, opposite to that in which the gear 161 is mounted, by threaded bolts and nuts 211 (Fig. 19). This head contains a tubular opening 212 with a seal 213 for the steering shaft. The latter comprises a bevel pinion 215 and a tube 156 which is welded thereto.

While I may use a conventional steering column it is at times preferable to have a live tube form the connection with the steering wheel 155. Adjacent the steering wheel this tube is supported by a needle bearing 220 whose outside race is crowned to permit some slight angular adjustment of the steering shaft. The bearing 220 is secured to the car body which in turn is secured to the frame or forms part of the frame of the vehicle. At its opposite end the steering shaft is mounted by a ball joint 223 which also permits angular adjustment. In this manner no excessive bearing loads can be built up through the moderate relative motion of the frame and body.

The ball joint 223 comprises a ball centered at the intersection of the steering axis with the axis of the transverse shaft 159. The ball 223 is secured to bevel pinion 215 through its stem 224 which is riveted in the shank of the pinion. The ball 223 is also journaled in a spherical recess provided in the bevel gear 158 and centered at the apex of that gear. It is further journaled in a part 228 rigidly connected with the head 210 through a nut 229 that threads into the head. This part 228 is kept from turning in the head by a key 230. In the way described a somewhat flexible connection between the steering wheel and the steering gear is attained which can adapt itself to working of the car and body. A low cost design with high efficiency is secured.

A bore 225 pierces the ball and the stem holding the wire or wires leading to the horn button 226 or horn-operating ring. The shift control levers may be located on a projection coaxial with the steering shaft or adjacent thereto.

By using two pairs of gears with angularly disposed axes to drive the central pivoted member, the connecting shaft turns much faster than the pivoted member. It is therefore lightly loaded and gives good control.

Increased efficiency, that is, reduced friction loss, is attained in two ways with the present invention, both tending to reduce the turning ratio of the hypoid gear pair. One of these ways is to split up the total ratio among the two pairs of gears for instance by using a reduction ratio of 3:2 or 2:1 in the bevel gear pair. The other way is to take additional reduction in the linkage between the pivoted member and the steering knuckles.

The friction loss in the hypoid gear pair depends on the amount of tooth sliding to produce a given turning motion of the gear member. Sliding increases with increase of ratio; and the friction loss accordingly increases with it. With lowered ratio the hypoid gears approach bevel gears and gain in efficiency. Accordingly with the two pairs of gears a higher working efficiency is attainable than with a single reduction drive. This efficiency is further increased by a reduction of the overall ratio, made possible through my new linkage.

While the invention has been described in connection with several different embodiments thereof, it will be understood that it is capable of further modification, and the present application is intended to cover any variations, uses, or adaptations of the invention following, in general, the principles of the invention, and including such departures from the present disclosure as come within known or customary practice in the art to which the invention relates and as may be applied to the essential features hereinbefore set forth and as fall within the scope of the invention or the limits of the appended claims.

Having thus described my invention what I claim is:

1. A steering mechanism for an automotive vehicle comprising a steering shaft, a transverse shaft, a pair of bevel gears connecting the two shafts at at least a 3 to 2 ratio of tooth numbers, the bevel gear of larger tooth number being secured to the transverse shaft, a pivoted member whose axis lies in a vertical plane extending lengthwise of the vehicle and is disposed at an angle greater than 45° to a horizontal plane, a pair of gears having angularly disposed offset axes connecting the transverse shaft with the pivoted member, said last-named pair of gears having at least 7½ to 1 ratio of tooth numbers and the larger member of said last-named pair being secured to the pivoted member, and linkages connecting the pivoted member to the two front wheels of the vehicle to steer said wheels on pivotal movement of said pivoted member.

2. A steering mechanism for an automotive vehicle comprising a steering shaft, a housing secured to the vehicle, a transverse shaft journaled in said housing, a bevel gear secured to one end of said transverse shaft, a hypoid pinion secured to the other end of said transverse shaft, a bevel pinion secured to the steering shaft adjacent its lower end and meshing with said bevel gear to rotate the transverse shaft on rotation of the steering shaft, a ball secured to said steering shaft at its lower end, said transverse shaft having a concave socket in it centrally of the tooth zone of said bevel gear to receive said ball, a block rigidly secured to the housing and having a concave socket therein disposed diametrically opposite the first-named socket to engage said ball, a pivoted member mounted in said housing, a hypoid gear secured to said member and meshing with said hypoid pinion, and separate linkages connecting said pivoted member with the two front wheels of the vehicle to turn the wheels on pivotal movement of the pivoted member.

3. A steering mechanism for an automotive vehicle comprising a steering shaft, a transverse shaft, a pair of bevel gears connecting the steering shaft to the transverse shaft at a ratio of tooth numbers of at least three to two, the larger member of the pair being secured to the transverse shaft, a pivoted member whose axis lies in a vertical plane extending lengthwise of the vehicle and is disposed at an angle larger than forty-five degrees to a horizontal plane, a pair of hypoid gears connecting the transverse shaft to the pivoted member, said pair of hypoid gears having a ratio of tooth numbers of at least seven and one-half to one, the larger member of the hypoid pair being secured to the pivoted member, a pair of links pivotally connected to the pivoted member at points offset from the axis of the pivoted member, a knuckle arm pivotally connected to each link, and a steering knuckle connected to each knuckle arm, the steering knuckles being swivelly mounted in the vehicle and each rotatably supporting one of the front wheels of the vehicle, the points of pivotal connection of each link with the pivoted member and its associated knuckle arm being so disposed to the pivotal axis of the pivoted member and the swivel axis of the associated steering knuckle, respectively, that the ratio of the turning velocity of the pivoted member and the steering knuckle is larger than 1:1.

4. A steering mechanism for an automotive vehicle comprising a steering shaft offset from the longitudinal center line of the vehicle, a steering wheel secured to one end thereof, a transverse shaft whose axis intersects the axis of the steering shaft, a pivoted member whose pivotal axis lies in a vertical plane containing the longitudinal center line of the vehicle and is disposed at an angle larger than forty-five degrees to a horizontal plane but is offset from the axis of the transverse shaft, two pairs of gears operatively connecting the steering shaft with said pivoted member at a speed reduction, one of said gears being coaxial with the steering shaft, two of said gears being secured to said transverse shaft at opposite ends thereof, respectively, and one of said gears being secured to said pivoted member, said speed reduction being split up between the two pairs of gears, each of said two pairs giving a speed reduction and the pair of gears connecting the transverse shaft with the pivoted member having at least a seven and a half to one ratio of tooth numbers and taking the larger share of the speed reduction, and the pair of gears which connect the steering shaft and the transverse shaft having a tooth ratio of at least three to two, the larger member being connected to the transverse shaft, a common housing in which said gears and shafts are mounted, and equal linkages connecting the pivoted member to the two front wheels of the vehicle to steer said wheels on pivotal movement of said pivoted member.

5. A steering mechanism for an automotive vehicle, comprising a pivoted member with a substantially vertical pivot axis, a pair of steering knuckles mounted in the vehicle for swivelling movement and on each of which is rotatably mounted one of the front wheels of the vehicle, a knuckle arm projecting from each steering knuckle forwardly of the plane containing the two axes of swivel, and a pair of links, each link being pivotally connected to the pivoted member at one end, the points of such pivotal connection of the two links being spaced from one another, and each link being pivotally connected at its opposite end to a knuckle arm, the extended lines connecting the points of pivotal connection of each link with the center of said pivoted member and with the associated knuckle axis, respectively, intersecting in a point that lies on a line which passes through the intersection point of the longitudinal axis of the link with a line that connects the knuckle axes, and which is inclined to said longitudinal axis at an angle $(90°-q)$ in the middle position of the steering mechanism, where angle $q$ is defined by:

$$\tan q = \frac{L}{W} \cdot \frac{C'}{C}$$

and where L is equal to the distance between the steering knuckles, W is the wheel base, C is the shortest distance between the axis of the pivoted member and the axis of a steering knuckle, and C' is the distance of the last-named intersection point from the pivot of the pivoted member.

References Cited in the file of this patent

UNITED STATES PATENTS

| | | |
|---|---|---|
| 810,673 | Rae | Jan. 23, 1906 |
| 904,146 | Pare | Nov. 17, 1908 |
| 1,243,317 | McKenzie | Oct. 16, 1917 |
| 1,379,762 | Hendrickson | May 31, 1921 |
| 1,780,370 | Tenny | Nov. 4, 1930 |
| 1,877,332 | Laisne | Sept. 13, 1932 |
| 2,153,233 | Best | Apr. 4, 1939 |
| 2,164,470 | Opolo | July 4, 1939 |
| 2,297,591 | Urich | Sept. 29, 1942 |

FOREIGN PATENTS

| | | |
|---|---|---|
| 414,416 | Germany | June 6, 1925 |

OTHER REFERENCES

Principles of the Basic Mechanisms (Textbook), Dept. of Marine Engineering, U. S. Naval Academy, 1938.